United States Patent Office 3,384,104
Patented May 21, 1968

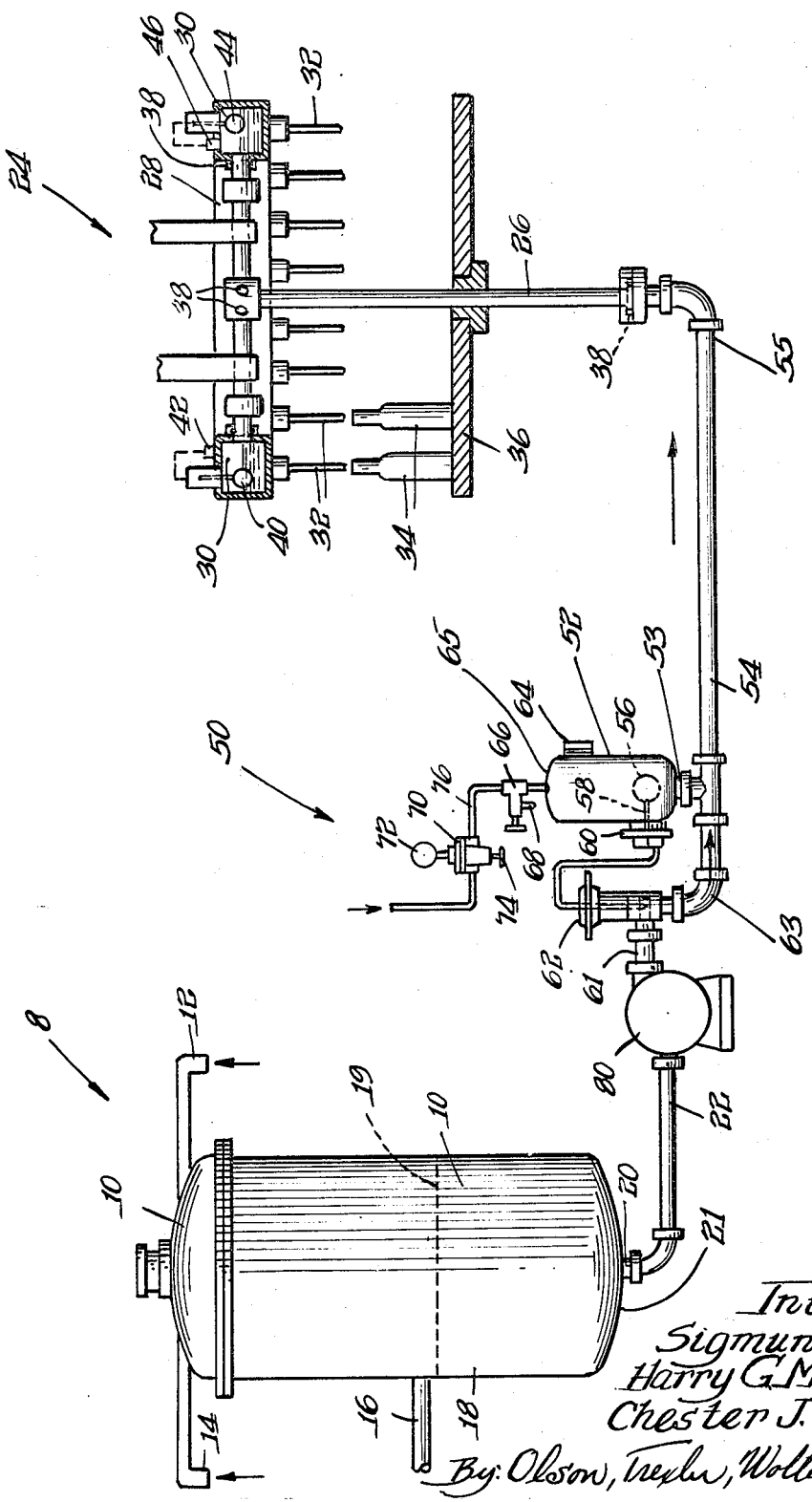

3,384,104
COUNTERPRESSURED LIQUID TRANSFER
APPARATUS AND VARIABLE CONTROL
THEREFOR
Sigmund P. Skoli, Elmwood Park, Harry G. Mojonnier, River Forest, and Chester J. Witt, Deerfield, Ill., assignors to Mojonnier Bros. Co., Chicago, Ill., a corporation of Illinois
Filed July 29, 1964, Ser. No. 385,953
1 Claim. (Cl. 137—209)

The present invention relates to an apparatus for modulating fluid pressure, and more specifically relates to an apparatus for adjusting the pressure of fluids flowing between a source of fluids and a distribution center for fluids at a different pressure.

More particularly yet, the present invention relates to a novel counterpressured liquid transfer apparatus and a variable control therefor to maintain a head space in the transfer apparatus at a predetermined pressure.

While various uses for certain features of the present invention may suggest themselves, the invention is particularly suitable for use in connection with the preparation of carbonated beverages and the transfer of carbonated beverages from a conventional beverage mixing apparatus to a conventional bottle filling apparatus. For purposes of facilitation of the present disclosure, the features of the present invention will be described with particular reference to their use in connection with a flow of beverages from a beverage mixing apparatus to a bottle filling apparatus.

*The problem and deficiencies of the prior art*

Under current practice, beverages within a conventional beverage mixing apparatus, as here contemplated, are maintained at a pressure of about the same or slightly greater than the operating pressure maintained within the bottle filling apparatus. The differential pressure between the mixing apparatus and the bottle filling apparatus causes a flow of beverages from the point of higher pressure in the mixing apparatus or "mixer" to the point of lower pressure in the bottle filling apparatus or "filler" as it will be hereafter referred to. Conventional means are provided in the filler to increase the pressure therein to a pressure equal to that in the mixer when beverages within the filler reach a predetermined level. As will be appreciated, when the pressure within the filler is equal to the pressure in the mixer, the flow of liquid to the filler stops.

For certain purposes, it may be desirable to operate the filler at a substantially lower operating pressure than the pressure in the mixer. In such cases, a pressure reducing device is required in the beverage line between the mixer and the filler to reduce the pressure of the beverages flowing through the lines to the filler pressure level. Unfortunately, commercially available pressure reducing devices are often relatively complicated and unduly expensive. Additionally, such commercially available pressure reducing devices are not of the sanitary variety so essential in the beverage industry and may be relatively difficult to clean. Further, commercially available pressure reducing devices of a self-acting or automatic design may require considerable technical competence to secure a satisfactory operation; and often require an objectionable drop of pressure across the device to operate properly.

*Objects of the invention*

Thus, it is an object of the present invention to provide a novel apparatus for adjusting the pressure on fluids flowing between a source of fluids at one pressure and a distribution center for fluids at a different pressure.

Another object is to provide a novel counter-pressured liquid transfer apparatus to modulate the pressure of beverages flowing between two points.

Another object is to provide a novel pressure modulating device that is simple and uncomplicated to operate and is of sanitary type construction.

It is a further object to provide a simple pressure modulating device to increase or decrease the pressure of beverages flowing through a line to a predetermined operating pressure of beverages in a bottle filling apparatus.

It is a further object to provide a novel pressure modulating device for beverages that is suitable for providing a smooth, trouble-free flow of beverages to a filler apparatus.

A related object is to provide such an apparatus which is simple and uncomplicated and which requires a minimum of technical competence to secure a satisfactory smooth continuous flow of beverages.

Another object is to provide a novel beverage pressure modulating device suitable for maintaining a smooth flow of beverages to a bottle filler apparatus without requiring a large pressure drop across the device to operate properly.

Another object is to provide a simple automatic differential pressure control device for maintaining beverages in a flow line at a predetermined pressure automatically.

These and other objects and advantages of the invention will appear from the description, appended claim and drawing illustrating a preferred embodiment of the invention connected between a conventional beverage mixing apparatus and a conventional bottle filling apparatus.

*Description of the invention*

A conventional beverage mixing apparatus or mixer 8 is seen in the drawing comprising a container 10 having water and syrup inlets 12, 14 and a carbonating gas inlet 16 to carbonate the mixed syrup and water and to maintain the carbonated beverages 18 so formed within the apparatus at a predetermined super atmospheric pressure. Syrup and water are mixed within the container in predetermined proportions with a predetermined level 19 of beverages maintained within the container.

A beverage outlet pipe 20 is provided at the bottom 21 of the container connected to a conduit 22 for flow of beverages from the tank.

On the right hand side of the drawing, a conventional bottle filler apparatus or filler 24 is seen having a rotating vertical pipe 26 for directing the flow of carbonated beverages from the mixer to a stationary horizontal pipe 28 connected to an annular rotating filler bowl 30 having a plurality of circumferentially spaced filler nozzles 32. The nozzles are adapted to fill a plurality of bottles 34 positioned directly beneath the nozzles on a platform 36 mounted on the vertical pipe 26 and rotating therewith. Conventional drive means, not shown, are provided to drive the vertical pipe 26 and the rotating bowl 30. Suitable rotary seals 38 are provided about the rotating vertical pipe and the filler bowl to prevent leakage of beverage at these points.

In operation, a predetermined level of beverages is maintained within the filler bowl by a conventional float 40 which responds to a lower level of beverages within the bowl to open bleed opening 42 which opens to the atmosphere to lower the gauge pressure within the bowl. A predetermined operating counterpressure is maintained above the beverages within the filler bowl, the particular pressure being usually the same or slightly less than the counterpressure maintained on beverages within the mixing container 10. When beverages within the filler bowl fall below a predetermined desired level, the float 40 opens bleed opening 42 lowering pressure within the filler bowl to a point below the pressure in vertical pipe 26 which is connected to the mixing container; and the differential pressure causes the beverages to flow to the point of lower pressure upwardly through the pipe 26 into the filler bowl.

When beverages have filled the bowl to a predetermined normal level, the bleed opening 42 is closed by action of the float. Beverages continue to flow into the bowl so long as the pressure therein is less than the pressure in the mixing apparatus. A high level float 44 is positioned within the filler bowl connected to a high pressure inlet line 46; when the level of beverages within the bowl reaches a predetermined high level mark, float 44 opens air line 46 connected to a source of air under pressure, not shown, to permit a flow of high pressure air into the bowl. When the pressure within the bowl equals the pressure on beverages in the vertical pipe, the flow of beverages to the filler bowl stops. The level of beverages within the bowl goes down as beverages flow through the filler nozzles to fill the bottles, and float 44 responds to the lower level of beverages in the bowl and closes the high pressure air inlet 46.

In the ordinary situation, the operating pressure in the filler is maintained at a pressure that is about the same or slightly less than the pressure in the mixer, and the vertical pipe 26 is connected in direct communication with the mixer outlet pipe 20. Thus, when the counterpressure in the bottle filler falls below the counterpressure in the mixer, beverages flow from the mixer upwardly through the vertical pipe 26 into the filler bowl.

Where it is desired to operate the filler at a considerably different operating counterpressure than the mixer counterpressure, a direct connection between the mixer and the vertical pipe 26 is not feasible, as will be appreciated, because of the difficulty of obtaining a smooth continuous flow of beverages to the filler.

In this situation, a differential pressure control device or counterpressured liquid transfer apparatus designated generally by the numeral 50 is provided between the mixer and the filler.

The apparatus 50 includes a pressure reducing tank 52 which is formed advantageously of stainless steel and has an opening 53 at its lower end connected to and in communication with one end of a conduit 54 which is connected at its other end 55 by suitable fittings to vertical pipe 26. A conventional float 56 and its float rod 58 are positioned within the tank 52 with the float rod 58 connected at its outer end to an air pilot 60. The float 56 controls the air pilot 60 which is adapted to actuate an air diaphragm valve 62 connected between the pipe 22 and tank opening 53 by conventional pipes 61, 63 to open and shutoff a flow of beverages through the valve to tank 52. When the level of beverages rises within the tank 52 to a predetermined float level, float 56 is raised signaling the air pilot 60 to close, shutting off the flow of air to air diaphragm valve 62 to stop a flow of beverages to the tank.

Tank 52 is provided with a sight glass 64 permitting an operator to look inside the tank to check its proper operation; and is connected at its top 65 to a washout flood valve 66 connected to a source of washout fluid 68, such as hot water or the like. A carbonating gas regulator valve 70 having a gas pressure dial 72 and a control knob 74 is also connected at its one end to the line 76 connected to the top of the tank 52. The regulator valve 70 is connected at its other end to a source of $CO_2$ carbonating gas supplied at a pressure of about 150 p.s.i.g.

The carbonating gas regulator valve controls the head space counterpressure within tank 52 at a predetermined pressure level which is the same or slightly greater than the operating pressure at which filler bowl 30 is to be operated. Where it is desired to operate the filler at a higher or lower pressure, it is a simple matter to change the head space counterpressure above the beverages in tank 52 by merely adjusting knob 74.

Since it may be desired to operate the bottle filling apparatus 24 at a relatively higher pressure than the pressure of beverages within the mixing apparatus 10, a booster pump 80 is provided in the flow lines between conduits 22 and 61 connected to air diaphragm valve 62. Booster pump 80 comprises a variable output centrifugal pump conventionally operated by a pump motor, not shown, to boost the pressure of beverages flowing through line 22 to a substantially higher pressure level.

*Operation of the invention*

From the above description, the operation of the embodiment of the invention shown should be clear. However, for a better understanding of the invention, its operation will be briefly described without numerical reference to the parts.

A novel apparatus has been provided for modulating or, in the usual case, reducing the pressure of fluids flowing between a beverage mixer and a bottle filler. A flow of fluids is maintained from a point of higher pressure in the mixer to a point of lower pressure in the filler so long as the beverages in the filler are maintained at a relatively lower pressure. Since it may be desired to operate the bottle filler at a substantially lower or higher counterpressure than the pressure of beverages within the fluid mixing tank, a pressure differential control device has been provided in which the pressure of beverages flowing through the lines is modified to a predetermined point. The level of fluids within the control device is maintained at a predetermined level by a float operated valve which stops the flow of beverages to the tank when that predetermined level has been reached.

The level of fluids within the pressure differential control tank is maintained relatively constant irrespective of the particular pressure on fluids within the system so long as a forward flow of fluids to the bottle filler is maintained.

Where it is desired to operate the bottle filler at a relatively higher pressure than the pressure within the mixer, a pump is provided in the line to increase the pressure on the beverage. The beverage pressure differential control tank reduces the pressure on the beverages flowing through the line to the counterpressure within the tank regardless whether the pump is or is not operating.

EXAMPLE A

For example, consider the situation where it is desired to operate the bottle filler at a pressure of 60 p.s.i.g. with the mixer operated at 60 p.s.i.g. also. In this situation, a smooth flow of beverages from the mixing apparatus to the bottle filler would obtain without the need for a pressure differential control device.

Now consider the situation where it was desired to operate the filler at a pressure of 40 p.s.i.g. in the filler bowl. As will be understood, the great differential in pressure between 60 p.s.i.g. in the mixing apparatus and the 40 p.s.i.g. in the filler apparatus would tend to cause an excessively fast and erratic flow of beverages to the filler. In this situation, a liquid pressure modulating apparatus in accordance with the teachings of the present invention is installed in the fluid lines between the mixer filler. The pressure modulating tank is positioned so that beverages tend to flow into the tank. A carbonating gas regulator valve is set to maintain the head space pressure within the tank at 40 p.s.i.g., that is, at the same pressure as that maintained within the filler bowl.

Beverages at 60 p.s.i.g. from the mixing apparatus flow into the tank. The float operated tank valve stops the flow of beverages to the tank at a predetermined desired beverage level; and beverages within the tank maintained at 40 p.s.i.g. tend to flow from the tank forwardly at the same to the bottle filler whenever the filler bowl pressure falls below the control tank pressure of 40 p.s.i.g.

EXAMPLE B

Consider another example where it is desired to operate the filler at a relatively higher pressure than the pressure of the beverages within the mixing apparatus, for example, 90 p.s.i.g. In this case, a booster pump in the line is started to boost the pressure of beverages flowing through the line from the 60 p.s.i.g. of the mixer to a pressure above that of the filler, for instance from 40 p.s.i.g. to 100 p.s.i.g. The carbonating gas regulator valve over the control tank is set to maintain the tank head space pressure at 90 p.s.i.g., that is, at the same pressure as the level of operation of the filler.

Beverages flow into the control tank at 100 p.s.i.g. pressure and the pressure is reduced there to 90 p.s.i.g. As beverages within the filler bowl fill therefrom to fill bottles, the bowl counterpressure is reduced to less than 90 p.s.i.g. causing a flow of beverages from the pressure reducing tank through the beverage flow lines to the filler bowl.

While a preferred embodiment of the present invention has been shown and described above, it is clear that structural details may be made without departing from the spirit and scope of the invention which is to be limited only by the appended claim.

The invention is hereby claimed as follows:

1. Beverage handling apparatus comprising: a supply vessel for containing beverage liquid at a preselected pressure; a filler for containing said liquid generally at a preselected higher pressure, said filler having a liquid space and a gas space over said liquid space; and a differential pressure control device for modifying the pressure on beverage liquid flowing from said vessel to said filler, said control device including a closed tank positioned between said vessel and said filler, first conduit means connecting said vessel to said tank to permit a flow of liquid into said tank, pump means connected to said first conduit means to boost the pressure of fluid flowing into said tank, second conduit means connecting said tank to said filler to permit a flow of liquid from said tank to said filler, gas supply means connected to said tank to maintain the liquid therein at a predetermined operating pressure at least as great as said preselected higher pressure, and liquid supply control means connected to said tank to maintain the level of liquid therein at a predetermined level, including valve means between said pump means and said tank spaced apart from said tank to avoid turbulence in said tank and valve operating means responsive to the liquid level in said tank operatively connected to said valve means, whereby liquid flows from said tank into said filler when the actual pressure in said filler is below said operating pressure.

References Cited

UNITED STATES PATENTS

| | | | |
|---|---|---|---|
| 966,921 | 8/1910 | Jones | 137—414 |
| 1,875,145 | 8/1932 | Ralston | 137—414 |
| 2,020,849 | 11/1935 | Muller | 137—209 |
| 2,273,344 | 2/1942 | Black | 137—209 X |
| 2,373,935 | 4/1945 | Winter | 139—209 |
| 2,760,704 | 8/1956 | Fechheimer | 141—145 X |
| 2,976,950 | 3/1961 | Smith | 137—209 X |

ALAN COHAN, *Primary Examiner.*